United States Patent [19]

Honey

[11] Patent Number: 5,535,578
[45] Date of Patent: Jul. 16, 1996

[54] LINKAGE DEVICE FOR MOUNTING SWATHER HEADER

[75] Inventor: Gregory J. Honey, Bracken, Canada

[73] Assignee: Honey Bee Manufacturing Ltd., Frontier, Canada

[21] Appl. No.: 417,834

[22] Filed: Apr. 6, 1995

[30] Foreign Application Priority Data

Jan. 3, 1995 [CA] Canada ..................................... 2139443

[51] Int. Cl.⁶ ..................................................... A01D 33/14
[52] U.S. Cl. ........................ 56/14.9; 56/15.6; 56/DIG. 14
[58] Field of Search ..................................... 56/14.9, 15.6, 56/15.7, 15.8, 218, 228, 321, DIG. 14

[56] References Cited

U.S. PATENT DOCUMENTS

| | | | |
|---|---|---|---|
| 4,724,661 | 2/1988 | Blakeslee et al. | 56/15.8 X |
| 5,327,709 | 7/1994 | Webb | 56/15.8 |
| 5,337,544 | 8/1994 | Lauritsen | 56/DIG. 14 X |
| 5,404,695 | 4/1985 | Gemelli | 56/15.8 X |

OTHER PUBLICATIONS

Speedrower Self–Propelled Windrowers 2450 2550 Ford New Holland, copyright 1992.

*Primary Examiner*—Terry Lee Melius
*Attorney, Agent, or Firm*—Kerkam, Stowell, Kondracki & Clarke; John C. Kerins

[57] ABSTRACT

A levelling mechanism for use a in lift system of a windrowing machine of the type including a tractor unit and a swather header to permit the use of a grain header which is held suspended above the ground rather than a hay type swather header which normally engages the ground during cutting. The type of lift systems used in some known hay windrowers include a pair of lift assemblies each of which has a single action lift cylinder. The two cylinders are supplied from a common supply line, and because the moving lift components of the two assemblies are individually activated by their respective cylinders the suspended grain header does not remain levelled under certain conditions, such as if there is a build up of greater crop weight at one end relative to the other. The present levelling mechanism includes a torsion bar carried at the front of the tractor unit, the torsion bar having radial arms at opposite ends which are connected to the moving component of the adjacent lift assembly so as to resist movement of the moving components out of unison, thus keeping the head level under normal cutting conditions.

8 Claims, 6 Drawing Sheets

LINKAGE DEVICE FOR MOUNTING SWATHER HEADER

BACKGROUND OF THE INVENTION

1. Field of the Invention

This invention relates to a levelling mechanism for use in maintaining a swather header level, particularly the header as used in a floating condition during the swathing operation.

2. Description of the Prior Art

There are marketed swathers which are of the self-propelled types, commonly termed "windrowers", and such machines include a tractor unit and a header. The tractor unit known as a windrower tractor is provided with a lift mechanism at the front, including a hydraulic system and linkage arrangement, for raising the header from a lowered operating position to a raised inoperative position free of the ground. Self-propelled windrowers of this type are manufactured and sold, for example, by Ford New Holland under the trademark SPEEDROWER, Models 2450 and 2550, and are specially designed for cutting, conditioning and windrowing hay. As the cutting of hay crops requires that the cut be made close to the ground, the header is provided with skid shoes which allow the hydraulic system to be actuated in a manner to move the header to the lowered operating position wherein the skid shoes ride on the ground and thus support the header with the cutting blade slightly above the ground level. As will be described in more detail below, the lift arrangement for such hay headers includes a pair of transversely spaced header lift assemblies, each including a single acting cylinder and a spring system for partially counteracting the weight of the header in the lowered position. When the cylinders, which are connected to a common hydraulic line, are actuated so that pressurized hydraulic fluid is provided from the line to cylinders, the header is raised. Because the header is carried by the transversely spaced skid shoes when cutting, levelling of the header is not a concern as the lift assemblies effectively operate independently. In fact, because the spaced skid shoes follow the ground contour, one end of the header can follow the ground to a higher level than the opposite end, and the hydraulic fluid simply flows from the cylinder which is being forced to a contracted condition to the other cylinder which is moving to a more extended condition.

Because a major cost of the windrower is in the windrower tractor unit, it is advantageous to be able to use the windrower tractor for other functions, including that of swathing grain crops. It is preferable, however, to utilize a different type of header for swathing grain, namely one which does not include conditioner rolls and which transfers the cut grain to a windrow opening of the header by a travelling belt rather than an auger feed. Also, because it is necessary to cut a grain crop at a greater distance from the ground, a grain swather does not ride on skid shoes but is held suspended at a higher elevation. With the above described lift assembly commonly provided on the hay windrower, such as the * SPEEDROWER and similar windrowers * - trade-mark sold by other agricultural equipment manufacturers, the grain crop swather can not be readily held in a level condition while swathing with the header held suspended above the ground because when the pair of hydraulic cylinders are not operated to their fully lifted positions, the fluid can be displaced from one lift cylinder to the other, depending on which end of the header is heavier.

SUMMARY OF THE INVENTION

It is the object of the present invention to provide a levelling mechanism which can be utilized on a windrower tractor to enable the tractor to be used with a grain swather header and to carry the header in a suspended swathing condition.

Accordingly, the present invention resides in a levelling mechanism for use in a lift system on a tractor for supporting a swather header, the lift system being of the type including a pair of lift assemblies each having a hydraulic cylinder one each being pivotally connected at one end to a fixed frame member and at an opposite end to a movable lift member connected to the header, the cylinders, when actuated, individually moving the lift members for raising the header between a header operative position and a header raised position. The levelling mechanism of the present invention includes mounting means for attachment to a front portion of the tractor, and a transversely extending bar carried in the mounting means for at least partial rotational movement about a longitudinal axis of the bar. A pair of arms are each rigidly affixed at their inner ends of the bar at spaced locations along the bar, each arm projecting radially from the longitudinal axis of the bar. Means interconnect one each of the arms to one of the moving lift members for resisting movement of said moving lift members out of unison.

It is desirable that provision be made in a header lift system to allow one end of a mounted header to raise relative to the other end if the end is pushed upwardly, such as when the one end rides up on an obstacle or a raised portion of the ground. Thus, according to one aspect of the invention, the bar may be in the form of a torsion bar selected in relation to the lift system and the header to torsionally flex sufficiently to allow the arms to flex out of unison in response to a significant force, thereby allowing the raising of one end of the header relative to the opposite end of the header.

In a specific embodiment of the invention the means interconnecting at least one of the arms of the levelling mechanism to one of the moving lift members is a linkage including means for selected adjustment permitting effective relative movement of the moving lift members out of unison for the purpose of achieving initial levelling of the header.

BRIEF DESCRIPTION OF THE DRAWINGS

In the accompanying drawings, which show an embodiment of the invention as an example.

DESCRIPTION OF A PREFERRED EMBODIMENT

Figure 2:
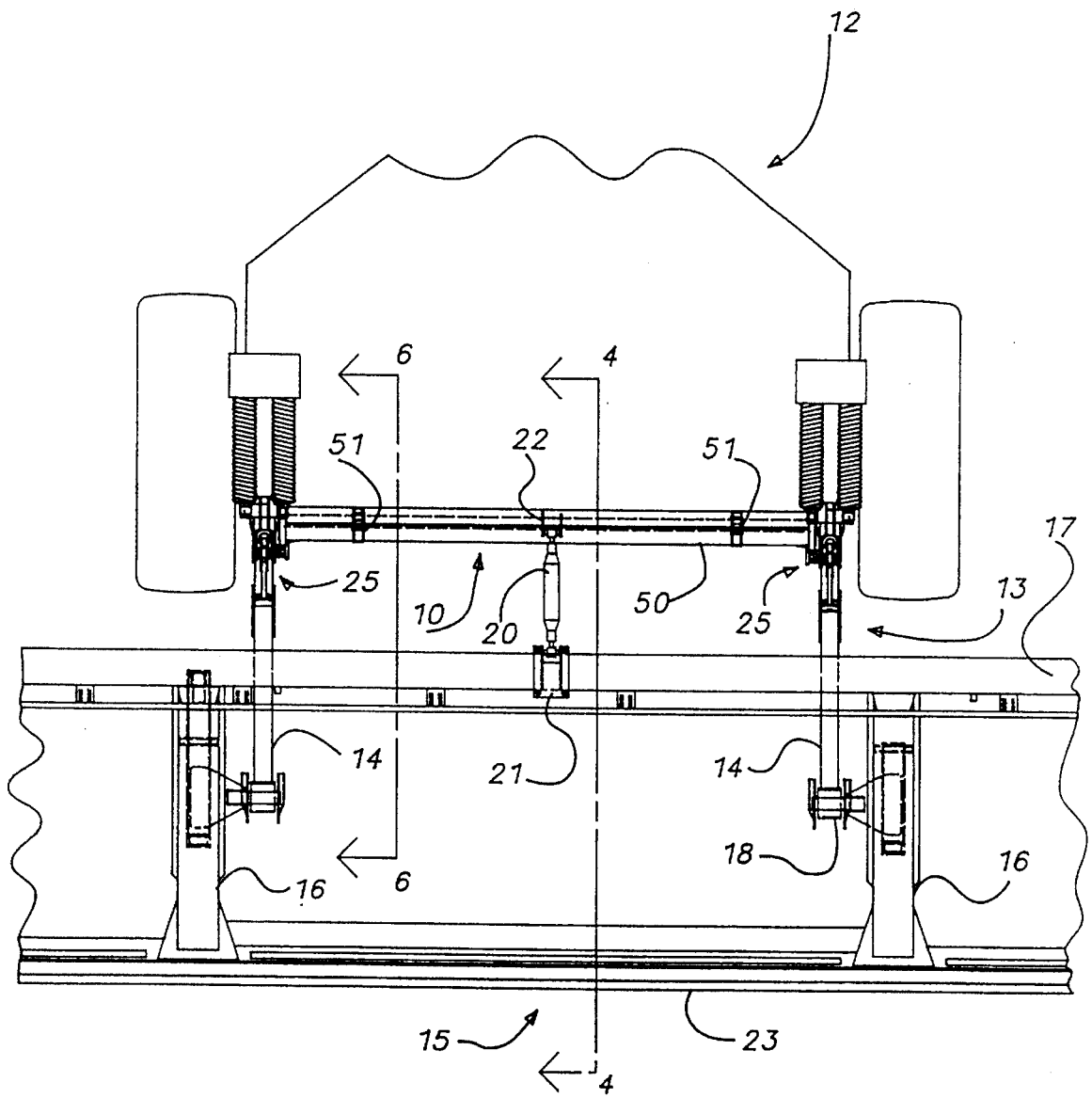
FIG. 2 is a top view of the tractor portion and lift system of FIG. 1, and showing the mid-portion of a grain swather header mounted thereon.
Figure 3:
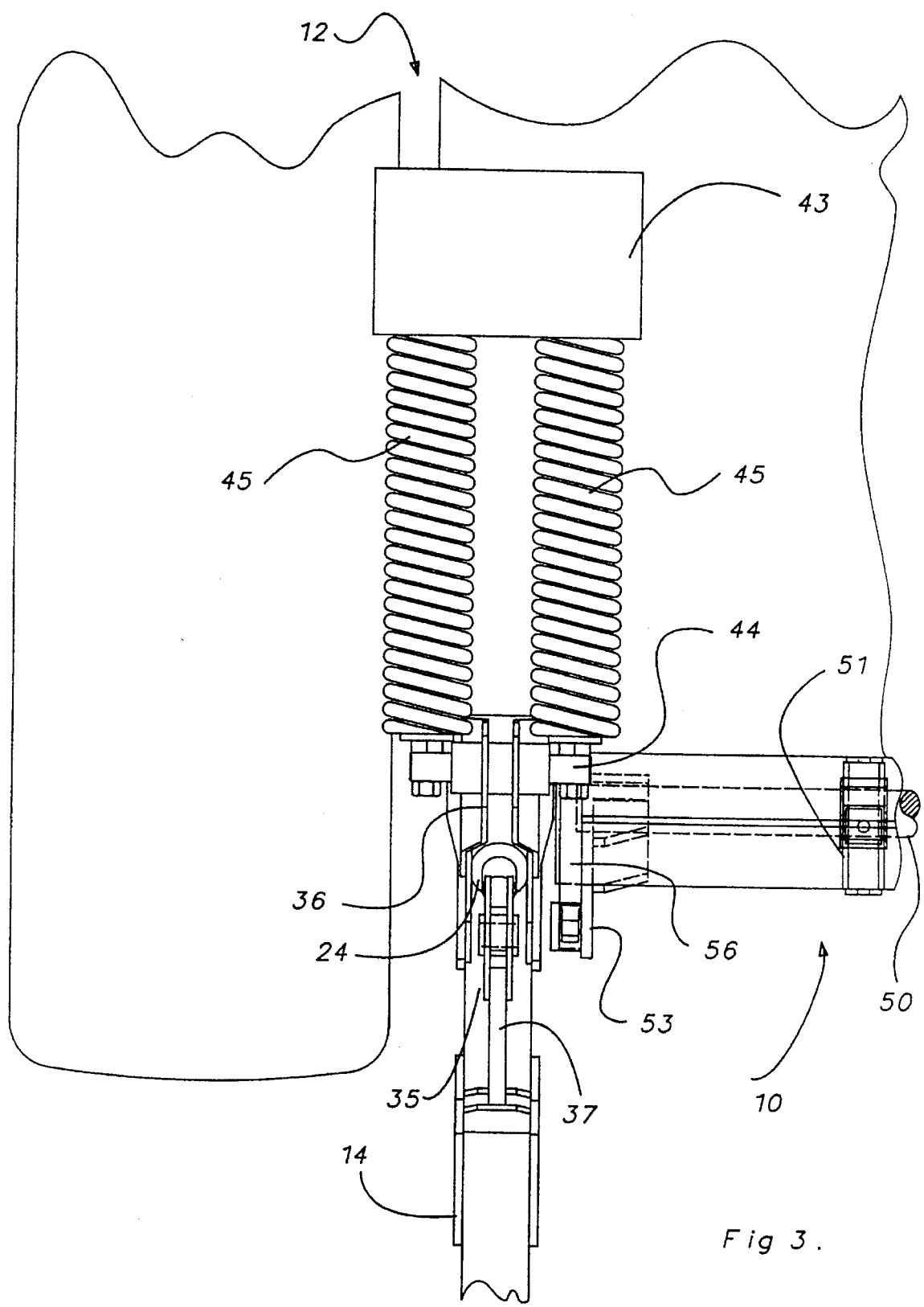
FIG. 3 is a top view on an enlarged scale showing part of one of the lift assemblies in the lift system of FIG. 1 and including one end of the levelling mechanism of the present invention.
Figure 4:
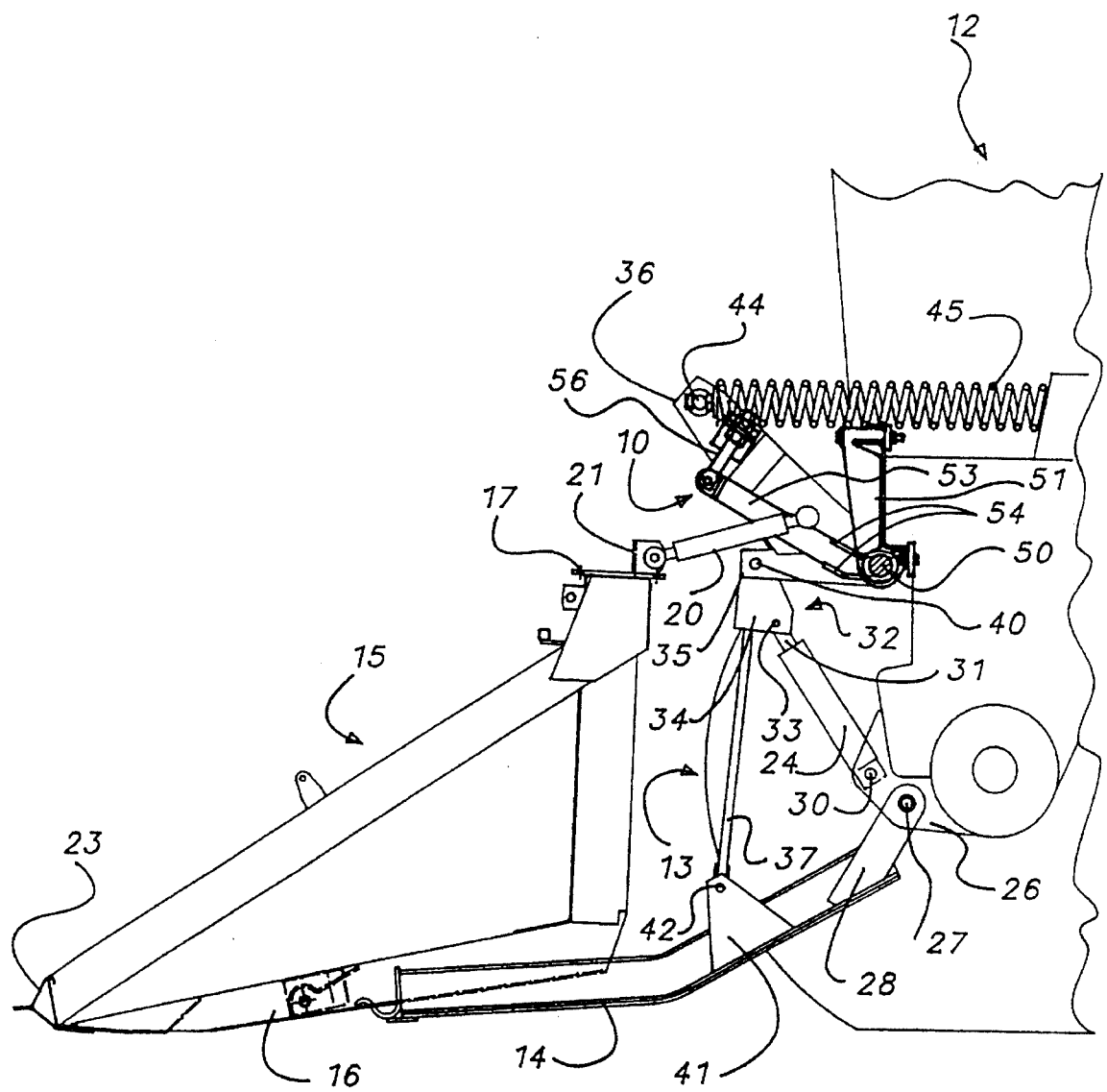
FIG. 4 and FIG. 5 are cross section views as seen from the line 4—4 of FIG. 2 showing the header in a lowered position and in a raised position, respectively.
Figure 5:
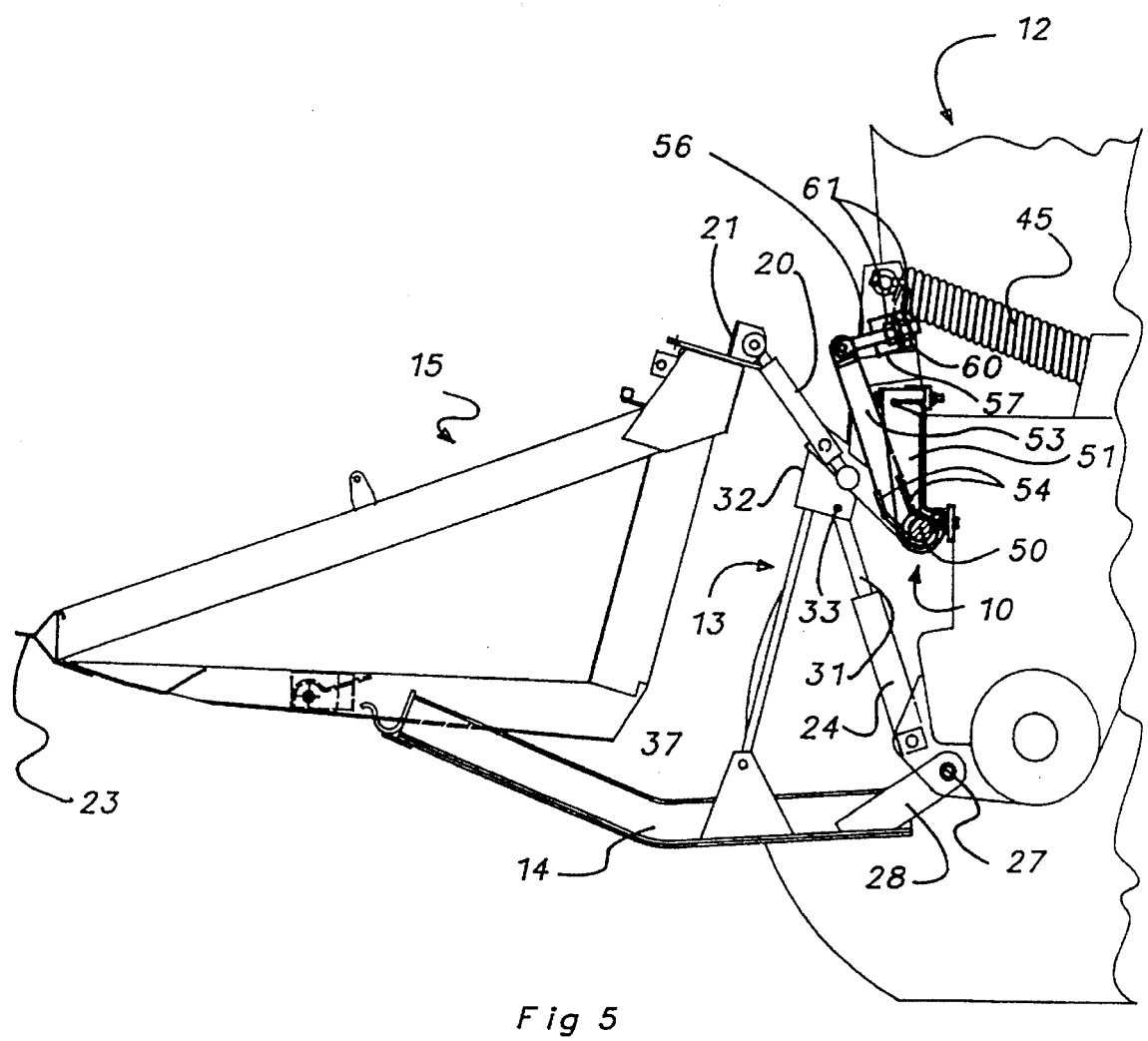

In the drawings, in which like reference characters denote like reference elements as referred to herein, there is generally denoted by the reference character 10 the levelling device or mechanism of the present invention. The levelling mechanism 10 is shown mounted on the front portion 11 of a windrower tractor 12 equipped with a lift system 13. The lift system 13, which is shown as being of the conventional type used in the windrower tractor of the above identified * SPEEDROWER of Ford New Holland, includes a pair of lower lift arms 14 supporting a swather header 15 (FIG. 2). The swather header 15 is of the type used in cutting and windrowing grain, and accordingly it is carried entirely by the tractor 12 and does not ride on skid shoes as does the normal hay header of the *SPEEDROWER windrower. The lift arms 14 have forward end portions which extend under the header for supporting the header, and when used in conjunction with the grain header 15 and when the lift system 13 incorporates the leveling apparatus 10 of the present invention, the lift arms 14 entirely support the header 15 during what my be termed a lowered swathing or operating condition.

The grain header 15 includes a pair of lower, forwardly projecting frame members 16 beneath the table thereof which are provided with bracket means 18 for engagement with the forward end of the transversely spaced lift arms 14. The framework of the header includes an upper, transversely extending frame member 17 which extends the full length of the header, and it is connected to a frame member at the front portion of the tractor 12 by way of an upper link 20, the connection at the front of the lift arms 14 and the link 20 thus in effect providing a three point connection between the header and the tractor. The upper link 20 is pivotally connected at its forward end to the upper frame member 17 by * - trademark way of a bracket 21 affixed to the frame member 17 and at its rear end to the tractor by way of a bracket 22 affixed to a frame member of the tractor 12. Extending entirely across the front edge of the header 15 is a sickle bar 23 for cutting the grain which is then carried by a belt (not shown) to a swath outlet of the grain header 15 (not shown). As indicated above, in grain swathing the grain may be cut at somewhat greater height than hay, and the sickle bar is thus positioned above the ground, its position being controlled by the machine operator by setting the retracted position of cylinders 24 of the lift system 13, as will be described in more detail below.

In the lift system 13 of the tractor 12 there is provided a pair of transversely spaced lift assemblies 25 of like construction, each including a downwardly depending rigid frame member 26 which is affixed to the framework of the tractor. As shown in the drawings, a lug 28 which is integral with the rear portion of the forwardly projecting lower lift arm 14 is pivotally connected to the lower part of the frame member 16 by way of a pivot pin 27. The axis of pivot of the lift arm 14 provided by the pin 27 extends transversely relative to the direction of travel so that each arm can pivot up and down in a vertical plane for thus lifting and lowering the header 15. The lower cylinder end of the cylinder 24 is pivotally connected to the frame member 26 by a pivot pin 30. The cylinder 24 has a piston rod 31 extending from the upper end and it is connected to a bracket 34 which is affixed to the upper end of a lift link 37 by way of a pivot pin 33. The upper arm 32 has a lower part 35 which has a rear portion thereof pivotally connected to the frame member 26, and an upper part 36 which projects upwardly and forwardly. The parts 35 and 36 are connected together so as to pivot as a unit relative to the frame member 26 about a transverse axis which is parallel to the axis of pivot of the lower lift arm 14. The bracket 34 of the lift link 37 is pivotally connected at its upper end by way of a pivot pin 40 to the lower part 35 of the upper arm 32 and at its lower end, the lift link 34 is pivotally connected to a lug 41 affixed to the lift arm 14 by way of a pivot pin 42. A pair of parallel springs 45 are positioned between a spring support member 43 at their rear end and a transverse pin 44 at their forward ends, the pin 44 extending through the outer end portion of the upper part 36 of the upper arm 32. The springs are in tension when the header is in a lowered condition as will be described further below.

Figure 6:
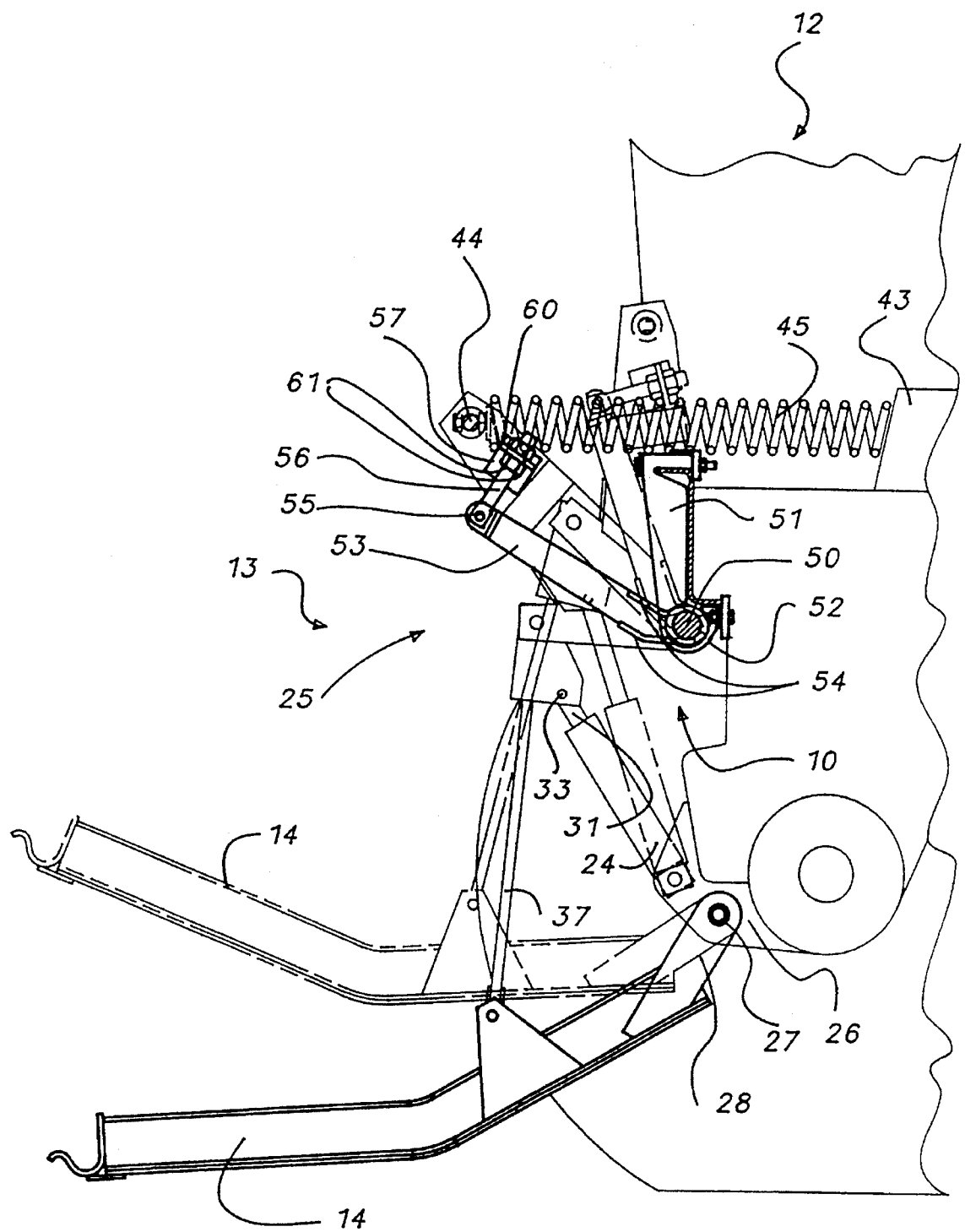
FIG. 6 is a view as seen from the line 6—6 of FIG. 2, but enlarged, and with the header removed for the sake of clarity, showing in phantom the lift assembly and levelling mechanism in the raised position as well.

The pair of lift cylinders 24 are each of the single acting type which are connected to a common hydraulic line (not shown) which receives pressurized fluid through a control valve located in the cab of the tractor. The line communicates with the outer end of each cylinder so that the admission of the pressurized fluid forces the piston rods towards or fully to the extended position as shown in phantom lines in FIG. 6 which represents a fully raised position of the header. In the fully raised position the upper arm 32 is allowed by the expanded cylinder to turn in a clockwise direction, as seen in FIG. 6, and the expanding cylinder also pulls up the lift link 37, this action providing the upward force on the lift arm 14 carrying the head. The turning of the upper arm 32 in this direction allows the springs 45 to contract, and in fact, the spring action by contraction assists in raising the header 15. When the operator of the machine actuates the control valve in the tractor cab to lower the head to an operating position, fluid is allowed to flow back from the outer ends of the cylinders 24 to the hydraulic reservoir as the weight of the header 15 pushes the lift arms 14 downwardly. When the skid shoes of the header of a normal hay swathing header of the type for which the lift system has been designed engage the ground, the tension under which the springs have been placed by the lowering action control the weight of the header actually carried by the skid shoes. In the design just described, where the lift assemblies are independent of each other, it is apparent that if one end of the header rides over a raised portion of the ground, that end is free to raise to a higher level than the opposite end of the header, the fluid remaining in the outer end of the cylinder at the lower end being free to flow to the outer end of the cylinder at the higher end via the common source line.

As previously described, the lift system described to this point is not in itself suited for use with a grain swathing header which is preferably supported solely by the lift system above the ground in that the independent lift assemblies are not capable of maintaining the head level. For example if a greater weight builds at one end during swathing, the weight will cause the end to be pushed downward and the fluid in the outer end of the cylinder 24 on the side corresponding to the heavier weighted end can simply displace to the other cylinder via the common supply line, thus permitting the opposite end to rise relative to the lower end. Accordingly, the principle purpose of the levelling mechanism 10 of the present invention is to ensure that the lift arms of the two Separate lift assemblies 25 normally function in unison. In the illustrated embodiment of the invention, this is accomplished by ensuring that the upper arms 32 which are moving components of the two lift assemblies move substantially in unison under normal operating conditions.

Figure 1:
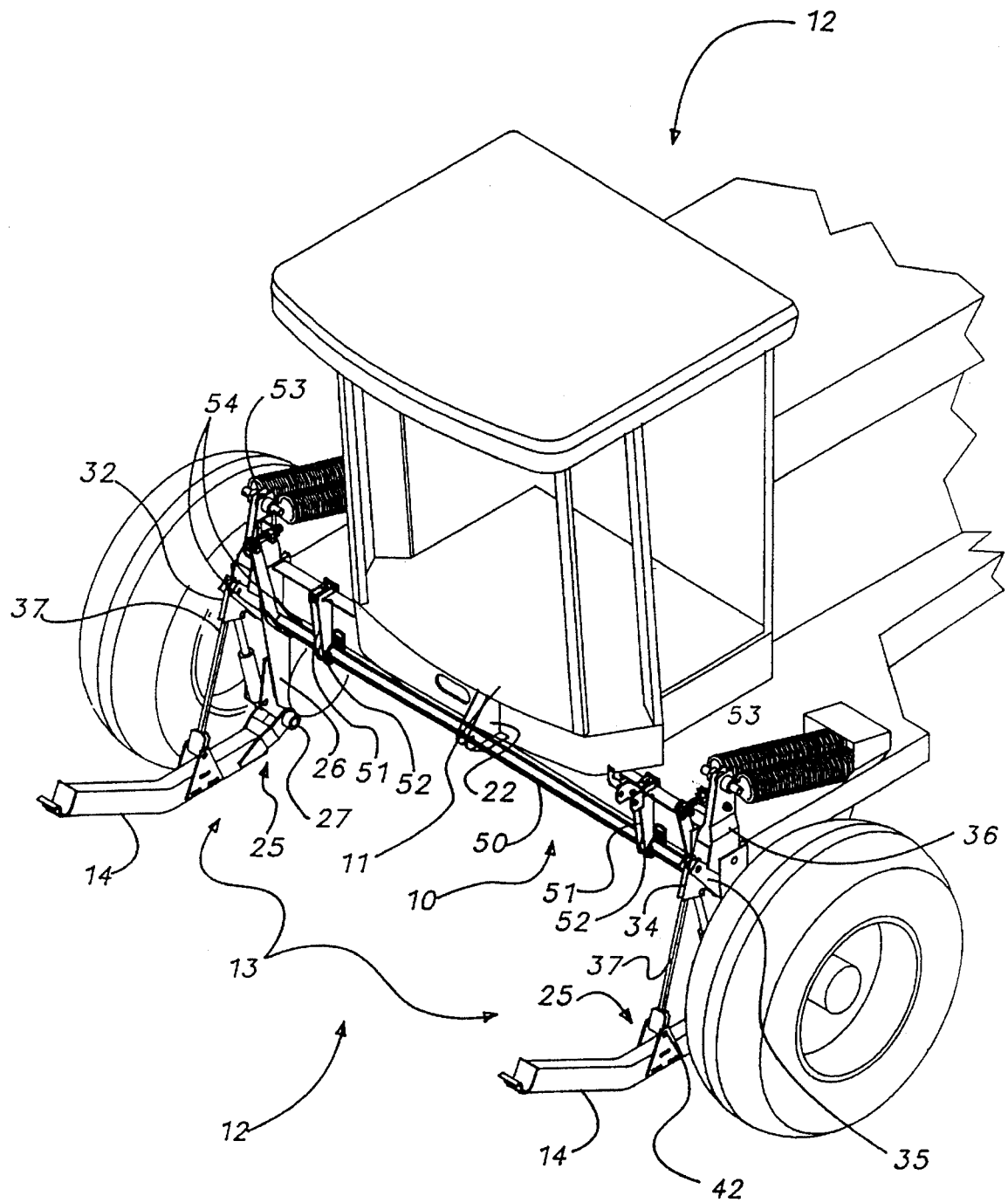
FIG. 1 is a perspective view of the front portion of a tractor equipped with a commonly used form of a lift system designed for a hay windrower and equipped with the levelling mechanism of the present invention.

The levelling mechanism 10 includes an elongated bar 50 which extend transverse to the direction of travel and is slightly shorter that the distance of the spaced lift assemblies 25. The bar 50 is mounted in a pair of brackets 51 which are designed for attachment to a frame portion at the front of the tractor. The brackets 51 have journal portions 52 to provide aligned bearing for supporting the bar 50 for at least limited rotation relative to the stationary brackets. A pair of arms 53 are affixed to opposite ends of the bar 50 and project radially relative to the longitudinal axis of the elongated bar 50. As can be seen in FIG. 1, for example, a pair of reinforcing flanges 54 are provided between the bar 50 and the sides of the arm 51 for strength purposes. Pivotally connected to the outer end of each arm by way of a pivot pin 55 is a link 56 which is connected to the upper part of the upper arm 32. The connection to the arm 32 is accomplished in a manner to effectively permit adjustment of the length of the link 56. An L-shaped bracket 57 (FIG. 6) is affixed, such as by bolting, to the side of the upper part 36 of the upper arm so as to provide a lug 60 which is aligned on a radially line extending from the axis of pivot of the upper arm 32, which pivot is coaxially with the axis of the bar 50. The lug 60 is apertured at a distance from the axis of the pivot of the upper arm equal to the distance of the axis of the pivot pin 55 from the axis of the bar 50, and the outer end of the link 56, which passes through the aperture of the lug, is threaded. Thus two lock nuts 61 are screwed onto to threaded portion on either side of the lug 60. By loosening the nut 61 on the outer end of the link 56, for example, and then threading out the nut 61 on the inner side of the lug 60, the effective length of the link can be increased.

When the grain swather header 15 is initially mounted on the tractor 12, by engaging the lifting arms 14 with the bracket means 19 of the header and the connecting link 20 between the brackets 21 and 22, the header 15 is initially raised, and by adjusting the effective length of one or both of the links 56 at the opposite end of the bar 50, the header can be levelled as between the opposite ends thereof. When swathing is to be started, depending on the condition and type of the grain crop to be harvested, the header is lowered to set the desired position of the sickle bar 23 above the ground by allowing evacuation of an amount of the fluid from the lower ends of the single acting cylinders 24. The lowering of the header will stretch the springs 45 of both of the lift assemblies 25 in the usual manner, and at the lowered position, the sickle bar will remain parallel to its initially levelled position. During operation, regardless of weight distribution along the length of the header, it will not vary substantially from the initially set horizontal position due to the fact the bar 50, while turning to allow the raising and lowering of the pivoted upper arms 32 of the two lifting assemblies 25, ensures through the connection of the set links 56 between the arms 53 and the upper arms 32, that the upper arms 53 of the two lift assemblies pivot in unison.

The bar 50, while being designed to provide sufficient resistance to twisting about its longitudinal axis to normally prevent any substantially deviation of the head from its initially set horizontal condition, also preferably functions as a torsion bar to allow turning of one arm 53 relative to the other under circumstances which establish high forces. Thus, in the event one end of the header engages an obstacle such as a raised portion in the ground, the header will be permitted to deviate from the level. Under such a circumstance, the relative turning of the arms 53 due to the torsional action of the bar 50 permits limited movement of the two upper arms 32 which in turn allows the header to raise at one end and thereby clear the obstacle rather than place undue stress on the header 15 and/or parts of the lift assemblies 25 which could cause damage.

Various alternatives may be made to the above describe embodiment of the invention by those skilled in the art without departing from the spirit of the invention as defined in the appending claims. For example, while the arms 53 of the bar 50 are shown as being attached by links 56 to the upper arms 32, the arms 53 could be connected to other moving components of the lift assemblies 25 to ensure movement of the lift arms 14 in unison under normally operating conditions. The arms 53 could be connected, for example, by a linkage means directly to the lift links 37 or the lift arms 14. Also, while it has been explained that the bar 50 is designed to function as a torsion bar to allow the header to deviate from its normally set leveled condition in the event an unusually high force is applied to the header, the bar could be designed to resist even the higher forces tending to turn one arm 53 relative to the other. Instead there could be provided other resilient means, such as one located between the link 56 and the upper arm 32 to allow some movement of the upper arms 32 relative to each other in the event of the occurrence of an unusually high force. It would further be obvious to provide means other than the threaded links to achieve the initial levelling of the header for presetting the position of a moving part of the lift assembly relative to the arms of the bar 50.

What I claim is:

1. A levelling mechanism for use with a lift system in a tractor for supporting a swather header, said lift system being of the type including a pair of lift assemblies each having a hydraulic cylinder, one each being pivotally connected at one end to a fixed frame member on said tractor and at an opposite end to a movable lift member connected to the header, said cylinders when actuated individually moving said movable lift member for raising said header between a header operative position and a header raised position, said levelling device comprising:

mounting means for attachment to a front portion of said tractor;

an elongated torsion bar extending transversely to the direction of travel and carried in the mounting means for at least partial rotational movement about a longitudinal axis of the bar, a pair of arms each rigidly affixed at inner ends of the bar at spaced locations along the bar, each arm projecting radially from the longitudinal axis of the bar; and means for interconnecting one each of the arms to one of said moving lift members, said torsion bar providing sufficient resistance to twisting about its longitudinal axis to resist movement of said movable lift members out of unison and being selected in relation to the lift system and said header to torsionally flex sufficiently to allow said arms to rotate out of alignment in response to a significant force raising one end of the header relative to the opposite end of the header.

2. A levelling mechanism as defined in claim 1, wherein said means interconnecting at least one of said arms to one of said moving lift members is a linkage including means for adjustment to permit effective relative movement of said moving lift members out of unison for the purpose of achieving initial levelling of said header.

3. In a windrowing machine including a tractor unit, a swather header, and a hydraulic lift system carried at a front portion of said tractor unit for supporting said header and selectively moving said header between a lowered operating position and a raised position;

said lift system having a pair of transversely spaced lift assemblies carried at opposite sides of the front portion of said tractor unit, each assembly including a frame member affixed to said tractor unit, a forwardly projecting, lower lift arm having a forward end engaging and supporting said header, said lift arm being pivotally connected adjacent a rear end to said frame member, an upper arm pivotally connected to said frame member and connected to said lift arm by a lift link, a hydraulic cylinder means being connected to a pressurized fluid supply line and being pivotally connected between said frame member and said lift link for raising said link and swinging said upper arm to a header raised position on admission of a pressurized fluid to one end thereof, the supply line of the cylinder means of both lift assemblies being connected to a common hydraulic supply line:

a levelling mechanism comprising;

a bar carried in mounting means attached to said front portion of said tractor, said bar extending transversely between said lift assemblies and being at least partially rotatable about its longitudinal axis within said mounting means;

a pair of arms affixed at inner ends thereof to said bar adjacent opposite ends of bar, said arms each having outer ends spaced radially outward of the longitudinal axis of the bar;

linkage means interconnecting one each of said arms to the upper arm of each lift assembly for resisting movement of said upper arms out of unison, whereby said lift arms are restricted to substantial unison movement in their support of said header.

4. In a windrowing machine as defined in claim 3, wherein the torsional resiliency of said bar in said levelling mechanism is selected to permit torsional flexing of said bar in response to forces applied to said header of a value greater than those occurring due to weight distribution on said header whereby said header is permitted under extreme conditions to move from a preset level condition.

5. In a windrowing machine as defined in claim 4, wherein the longitudinal axis of the bar in said levelling mechanism is on a common line extending through the axis of pivot of the upper arms in said pair of lift assemblies.

6. In a windrowing machine as defined in claim 4 wherein said linkage means between the outer end of at least one of each arms of said bar in said levelling mechanism and the upper arm of the respective lifting assembly is of adjustable length for permitting adjustment of the distance between said arm and the upper arm of the lifting assembly whereby initial levelling of the header may be set.

7. In a windrowing machine as defined in claim 6 wherein said upper arm of each lift assembly has an upper portion, and each lift assembly further includes tension spring means extending between said upper portion and a frame support means on said tractor unit for applying an assisting force to said upper arm in a direction of lift of said header, and wherein said linkage of said levelling mechanism extends between the outer end of said arm of said bar in said levelling mechanism and a connecting means on the upper arm of the respective lift assembly.

8. In a windrowing machine as defined in claim 7, wherein said connecting means on said upper arm includes a lug affixed to said upper portion, said lug having an aperture therein, wherein said linkage means includes a link pivotally connected at one end to said outer end of said arm of said bar in said levelling mechanism and having an opposite end extending through said aperture in said lug, said opposite end of said link being threaded, and wherein locking nuts are threaded onto said threaded end to position the extent of said link extending through said opening, whereby the effective length of said link between said arm and said upper portion of said upper arm of the respective lift assembly is adjustable.

* * * * *